United States Patent
Wolfman et al.

(10) Patent No.: US 7,496,362 B2
(45) Date of Patent: Feb. 24, 2009

(54) CELLULAR NETWORK INFRASTRUCTURE AS SUPPORT FOR INBOUND ROAMING USERS

(75) Inventors: Shlomo Wolfman, Hod-HaSharon (IL); Shany Elkarat, Petach Tikva (IL); Li-On Raviv, Petach Tikva (IL)

(73) Assignee: StarHome GmbH, Zurich (CH)

( * ) Notice: Subject to any disclaimer, the term of this patent is extended or adjusted under 35 U.S.C. 154(b) by 594 days.

(21) Appl. No.: 11/190,930

(22) Filed: Jul. 28, 2005

(65) Prior Publication Data

US 2006/0025129 A1 Feb. 2, 2006

Related U.S. Application Data

(60) Provisional application No. 60/591,600, filed on Jul. 28, 2004, provisional application No. 60/599,548, filed on Aug. 9, 2004.

(51) Int. Cl.
H04Q 7/20 (2006.01)
(52) U.S. Cl. ............. 455/432.1; 455/435.1; 455/552.1; 370/349; 370/355
(58) Field of Classification Search ........... 370/349, 370/352, 355, 356; 455/187.1, 432.1, 435.1, 455/552.1
See application file for complete search history.

(56) References Cited

U.S. PATENT DOCUMENTS 5,995,823 A * 11/1999 Stephens ................ 455/410
6,002,759 A 12/1999 Kallioniemi et al.
6,236,857 B1 5/2001 Calabrese et al.
6,487,412 B1 11/2002 Brennan et al.
2003/0158812 A1* 8/2003 Engelhart ................ 705/39
2004/0224680 A1 11/2004 Jiang
2005/0070278 A1 3/2005 Jiang
2005/0186950 A1 8/2005 Jiang
2005/0192035 A1* 9/2005 Jiang ................. 455/461
2005/0198096 A1* 9/2005 Shaffer et al. ............ 709/200

FOREIGN PATENT DOCUMENTS

| EP | 1111945 | 9/1914 |
|---|---|---|
| EP | 1349403 | 1/2003 |
| WO | WO 03/056867 | 7/2003 |
| WO | WO 2004/014101 | 2/2004 |
| WO | WO 2004/075484 | 2/2004 |
| WO | WO 2004/075579 | 2/2004 |
| WO | WO 2004/075598 | 2/2004 |
| WO | WO 2005/017693 | 2/2005 |
| WO | WO 2005/018245 | 2/2005 |
| WO | WO 2005/081962 | 9/2005 |
| WO | WO 2005/086927 | 9/2005 |

* cited by examiner

*Primary Examiner*—Dwayne D Bost
*Assistant Examiner*—Inder P Mehra

(57) ABSTRACT

The CAMEL standard allows a roaming user to have his call or any other telephony service, say SMS and GPRS, controlled and services provided from his home network. The invention allows infrastructure triggers to be intercepted at the roaming network so that the roaming network can identify the roamer and make use of the triggers to provide services. This is possible irrespective of whether the roamer's home network supports the infrastructure.

18 Claims, 7 Drawing Sheets

Inbound services on top of CAMEL

The CAMEL triggers will be delivered first to the SCP', being a part of the solution, then delivered to the home network by SSP', also part of the solution. (CAP: CAMEL Application Protocol)

CAMEL IRE

The CAMEL triggers will be delivered to the solution platform, located at the sponsored network, then delivered to the home network. The green line stands for the MAP signaling, which is routed via the sponsored network too.

CELLULAR NETWORK INFRASTRUCTURE AS SUPPORT FOR INBOUND ROAMING USERS

RELATED APPLICATIONS

The present application claims priority from U.S. Provisional Patent Applications No. 60/591,600, filed on Jul. 28, 2004, and Ser. No. 60/599,548, filed on Aug. 9, 2004, the contents of both of which are hereby incorporated by reference.

FIELD AND BACKGROUND OF THE INVENTION

The present invention relates to a cellular network infrastructure for use in support of inbound roaming users and, more particularly, but not exclusively to the use of the CAMEL infrastructure, specifically intended for support of outbound roamers, to support inbound roamers.

The GSM CAMEL (Customized Applications for Mobile Network Enhanced Logic) standard is a standard for a cellular network infrastructure, which is aimed at providing services for outbound roamers. CAMEL works where both the home or HPMN (home public mobile network) and visited or VPMN (visited public mobile network) networks have installed CAMEL infrastructure, have a signed CAMEL roaming agreement between them, and have gone through the CAMEL integration process within their respective networks.

Upgrading network infrastructure to CAMEL involves the introduction or modification of several network components and is an intensive and expensive effort. One-by-one integration of the infrastructure and ongoing support for CAMEL roaming agreements provides an additional and significant cost for the operator. Currently, most of the roaming agreements between operators lack CAMEL capabilities, although CAMEL is gradually being introduced to more and more networks.

Another issue is that even if CAMEL is available, what it does is gives exclusive support to the home network to manage the roaming user and eliminates VPMN control almost totally from its inbound roaming subscriber once CAMEL has been activated. Thus, for example: if an inbound roamer for whom CAMEL services are available makes a dialing error, the only network that can play any part in fixing it is the HPMN, and in the vast majority of cases no fixing of the error in fact occurs. In many respects the VPMN has more ways to fix the dialing error since it knows of local numbering plans and the like.

CAMEL is a standard with an implementation which covers a core network and allows for support for outbound roamers specifically. Two CAMEL networks make an agreement between them and the result is integration of the networks, in the sense that outbound roamers on either of the networks who have come from the other network are provided with service support from their home network.

In all GSM networks, regardless of CAMEL support, the mobile telephones issue a location update trigger upon arriving at the VLR of the roaming network. Consequently, a user profile is sent from the home network to the roaming VLR. The operation to transfer the user profile in the roaming case is exactly the same as that which goes on in the national network when a user moves to another location. That is to say, triggers are used to transfer the user profile from the home location register HLR to the visitor location register VLR.

CAMEL, in addition, enables call control triggers, among other triggers, issued by the roaming network, to reach the home network not only during location update events. The CAMEL triggers allow the home network to take charge of the call and the home network is able to control the call with all the signaling necessary as if the roaming telephone is at the home network. Newer phases of CAMEL (such as phase 3) support not only call control, but SMS (short messaging service) and GPRS (general packet radio service) control. Triggers for MO (Mobile Originated) SMS and GPRS sessions initiated by roamers may be sent to the home network, which is be able to control the SMS/GPRS session (e.g. redirect, block if no credit, etc.). Using the present embodiments, the SMS and GPRS triggers can also be intercepted and dealt with by platform 14.

As mentioned above, putting the home network in charge can have disadvantages. For example there is the issue of knowing the local numbering plan and there are also well known national shortcodes, such as the numbers for the emergency services. A roamer from say the UK who is visiting the US would normally reach the US emergency services if he were to dial *911. However if Camel were in operation then his call to *911 in the US would go first to his UK operator who may not recognize the code at all, or at best would recognize after a delay and reroute the call.

There is thus a widely recognized need for, and it would be highly advantageous to have, a roaming system devoid of the above limitations.

SUMMARY OF THE INVENTION

According to one aspect of the present invention there is provided apparatus for routing at least one cellular trigger for a roaming cellular user having a home cellular network and a roaming cellular network, at least the roaming cellular network having an infrastructure that supports passing of call control functions from the roaming cellular network to a compatible home network, said roaming cellular network having a call control processing unit for carrying control functions for calls, the apparatus comprising:

an interception unit associated with said roaming network for intercepting said call triggers issued in association with said infrastructure and directed at a respective call control processing unit of said home network, and a redirector, associated with said interception unit for redirecting said call triggers to a respective call control unit of said roaming network, thereby to allow said roaming network call control unit to carry out at least one call control function.

According to a second aspect of the present invention there is provided a method for obtaining at least one call control function for a roaming cellular user having a home cellular network and a roaming cellular network, at least the home cellular network having an infrastructure that supports passing of call triggers from the roaming cellular network to a compatible home network, each network having a call control processing unit for carrying out functions for calls, the method comprising:

intercepting call triggers issued in association with said infrastructure and directed at a respective call control processing unit of said home network, and redirecting said call triggers to a respective call control unit of said roaming network, thereby to allow said roaming network call control unit to carry out at least one call control function.

According to a third aspect of the present invention there is provided a cellular network able to support home users and roaming users and having a services infrastructure for providing support to outbound roamers, the network comprising:

an interception unit for intercepting event signals from inbound roamers requesting support from respective home networks; and a redirection unit for redirecting said event signals to provide support to said inbound roamers from said services infrastructure for providing support to outbound roamers.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fumdamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
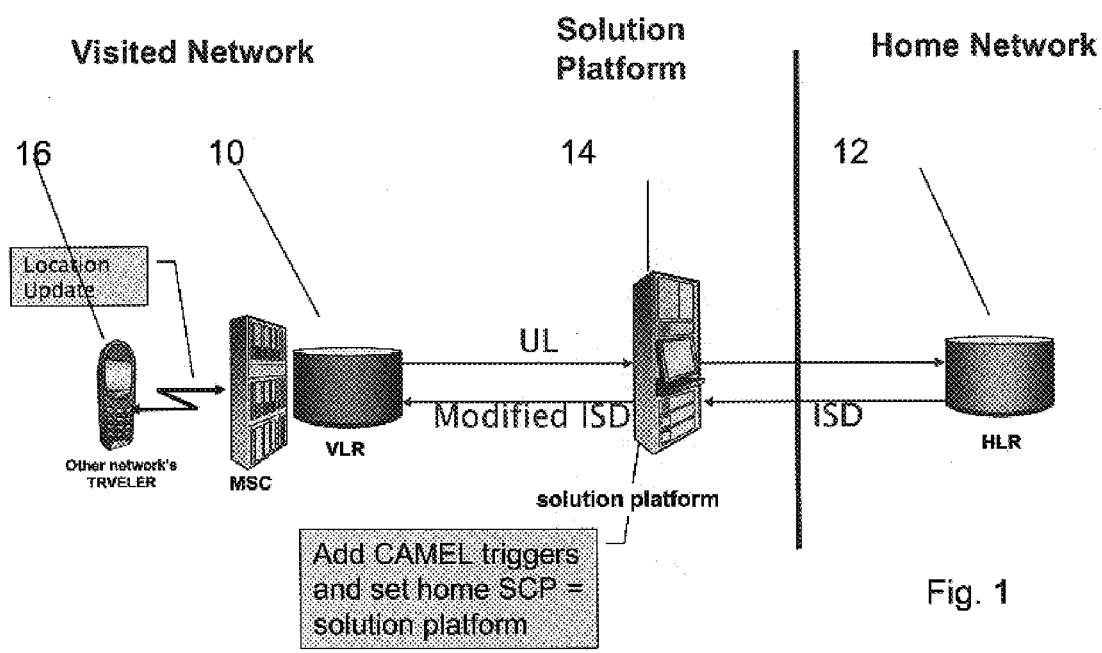
FIG. 1 is a simplified diagram showing a home network and a visited network, wherein the visited network is provided with a platform according to a preferred embodiment of the present invention.

The present embodiments allow infrastructure triggers, typically of the CAMEL infrastructure, to be intercepted at the roaming network so that the roaming network can identify the roamer and make use of the triggers to provide services. This is possible irrespective of whether the roamer's home network supports the infrastructure.

The present embodiments further provide an apparatus and a method for the utilization of CAMEL infrastructure in a given network for providing services to its inbound roamers, without communicating with the home network of the roaming subscribers. This method enables fast and cheap utilization of the CAMEL infrastructure without the need for one by one integration and ongoing support with its roaming partners.

Some of the services that the VPMN supplies to its home users can be made available to inbound roaming users based on the ability of the VPMN to gain control of a call via CAMEL, handle the call and only later pass on call control to the HPMN.

The present embodiments concern the utilization of CAMEL infrastructure in a given network for providing services to its inbound roamers, without initially communicating with the home network of the roaming subscribers. The method disclosed herein enables fast and cheap utilization of the CAMEL infrastructure without any need for one by one integration or ongoing support with roaming partners. The ability to provide these services is in one embodiment based on the ability of the VPMN to gain control of a CAMEL subscriber call, handle it and only then pass on call control to the HPMN.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which is a simplified block diagram according to a first preferred embodiment illustrating apparatus for controllably retaining call control responsibility at a visited network. FIG. 1 shows a visited or roaming network 10, a home network 12 and a platform 14 which mediates between them.

The roaming user permanently resides at home network 14 where his mobile device is registered, but he is currently located out of reach of his home network, typically because he is traveling abroad. Thus the roaming user connects via his mobile telephone 16 to roaming network 12. The roaming network 10 is preferably supplied with the CAMEL infrastructure, and typically the home network 12 is also supplied with such infrastructure.

The CAMEL infrastructure supports passing of call control functions from the roaming network to the home network, although both networks have call control processing infrastructure for carrying control functions for calls. Thus in ordinary use of CAMEL, control functions including service provision for roaming user 16 is actually made at his home network.

However, in the presently preferred embodiments, platform 14 intercepts the CAMEL triggers that are sent to the home network and redirects the triggers to the visited network call control infrastructure so that any requests for services can be provided at the local level if appropriate. The redirection may be achieved as follows: the home network has a CAMEL structure called an SCP to which the triggers are addressed. The roaming network simply sets the address of platform 14 as the home SCP for all triggers issued on the roaming network. It is thus possible to ensure that the roaming triggers all reach platform 14.

Figure 2:
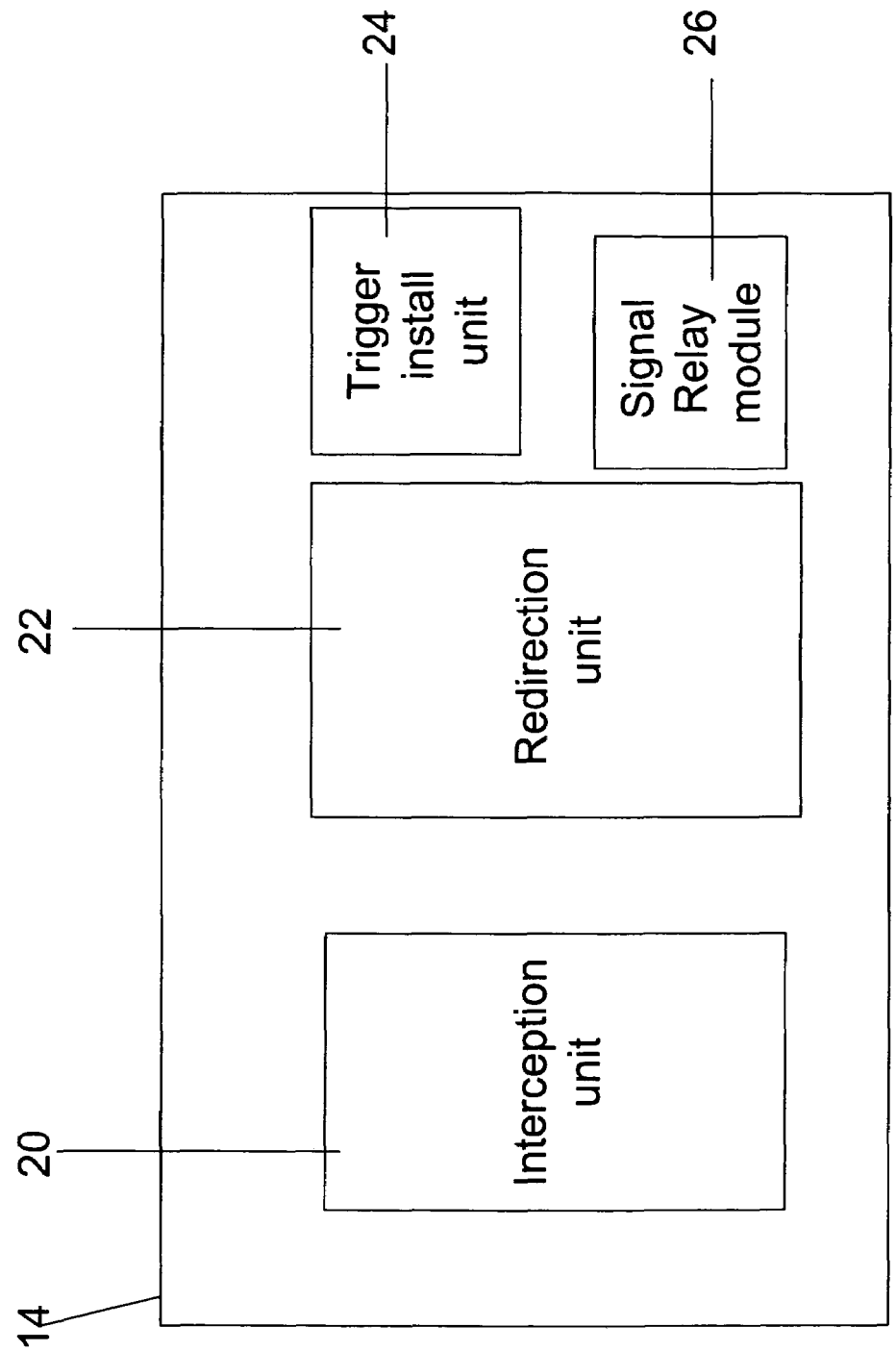
FIG. 2 is a simplified diagram showing the platform of FIG. 1.

Reference is now made to FIG. 2, which shows functional features of the platform 14. Platform 14 comprises an interception unit 20 which carries out interception of CAMEL call control triggers to prevent them from reaching the home network. The triggers are in fact modified by the interception unit and sent to redirector 22 which can redirect the triggers to the local call control infrastructure so that a particular desired service can be provided by the local network rather than the home network. In practice redirecting the triggers may be achieved by modifying the ISD (insert subscriber data) message, and at the same time updating the gsmSCF (GSM service control function, where GSM is the global system for mobile comunication) field in the message, which is the pointer to the actual SCP address. The actual SCP (service control point) address would be the home SCP if CAMEL is supported by the home network. In this field we store the address of platform 14.

In preferred embodiments it is possible to change other fields, such as the CAMEL service key. The key indicates the type of service, which can differ for certain subscribers.

Preferably the redirector 22 is provided with intelligence to enable it to judge which services are best provided at the local level and which are best provided by the home network. Thus for example requests for voicemail are best serviced by the home network since the roamer is not likely to have a voice mail box at the roaming network. However shortcodes that only exist at the local, that is roaming network, are best dealt with at the roaming network. If the redirector 22 concludes that the service is best provided from the home network then the triggers may be passed on to the genuine home network SCP and the service provided from there in the normal CAMEL fashion.

Figure 3:
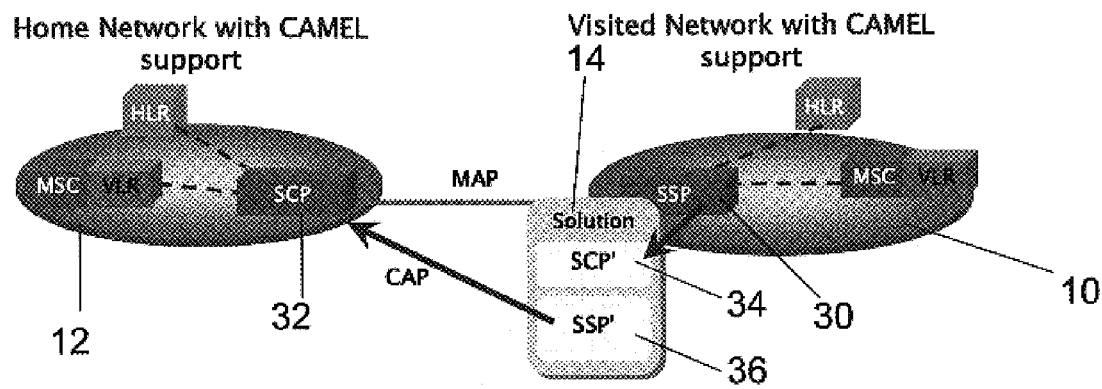
FIG. 3 is a simplified diagram showing in greater detail the home and visited networks and the platform of FIG. 1.

Reference is now made to FIG. 3, which is a simplified diagram showing the home and visited networks in greater detail, with CAMEL features and showing the platform 14 in greater detail. The parts of the CAMEL infrastructure that work with the triggers in the normal way are the SSP (signal switching point) 30 at the visited network which directs triggers to the home network, and the SCP 32 at the home network which receives the triggers and uses them to arrange local call control. Platform 14 provides SCP' (service control point) 34 which intercepts the incoming triggers by impersonating SCP 32, and arranging for local call control at the roaming instead of home network. That is to say the SCP' 34 includes the functionality of interception and redirection. Additionally there is provided SSP' which relays triggers on to the home network when the roaming network already has or does not wish to provide the service. The SSP' thus takes on the second redirection function, namely to redirect the triggers to the home network and thus make available to the roaming user, services that are provided to home users of the roaming network.

Figure 4:
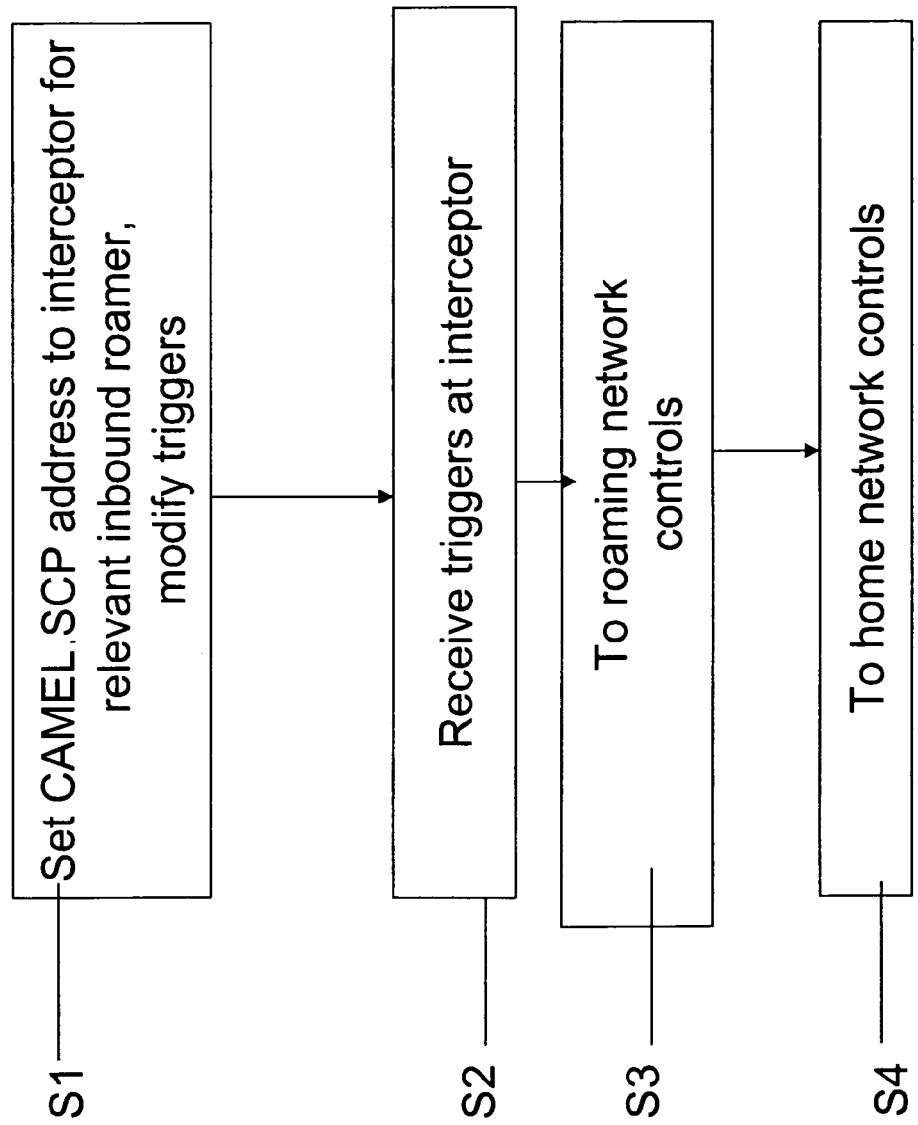
FIG. 4 is a simplified flow chart illustrating a process for redirecting a CAMEL trigger according to a preferred embodiment of the present invention for a user having CAMEL availability at both his home and roaming network.

Reference is now made to FIG. 4 which is a simplified diagram showing a method for shifting call control functions for a roaming cellular user with CAMEL availability, so that the roaming network is initially selected to provide the service requested. It is noted that the term "user with CAMEL availability" refers to a user who has CAMEL at both his home and visited network and a CAMEL agreement between them. First of all, in stage S1 the roaming network sets its SCP' 34 as the CAMEL SCP for relevant inbound roamers, so that all CAMEL triggers of these inbound roamers are directed to it no matter what the actual home network. The calls so redirected are now received at the SCP' in stage S2. In stage S3 the service is provided at the roaming network if available. In stage S4 the call control is sent on to the genuine SCP 32 and the home network handles the trigger. It is noted that the redirection unit is preferably programmed to discern between services which are best provided at the home network and services best provided at the roaming network and redirect accordingly. This is done by pre-defined service provisioning.

In general, inbound roamers coming to a roaming network with CAMEL support can be divided into two groups: (a) those belonging to home networks, hereinafter HPMNs, which have CAMEL support as well, and have already established a CAMEL roaming agreement with the current VPMN, so the VPMN is committed for supporting the CAMEL triggers installed by the HPMN in the local VLR, per subscriber and (b) all the rest. Group a) are hereinafter referred to as roamers with CAMEL availability. FIG. 4 describes the procedure for Group a) users. As will be explained below, for Group b) users two modifications are made to FIG. 4, and these are shown in FIG. 5.

Figure 5:
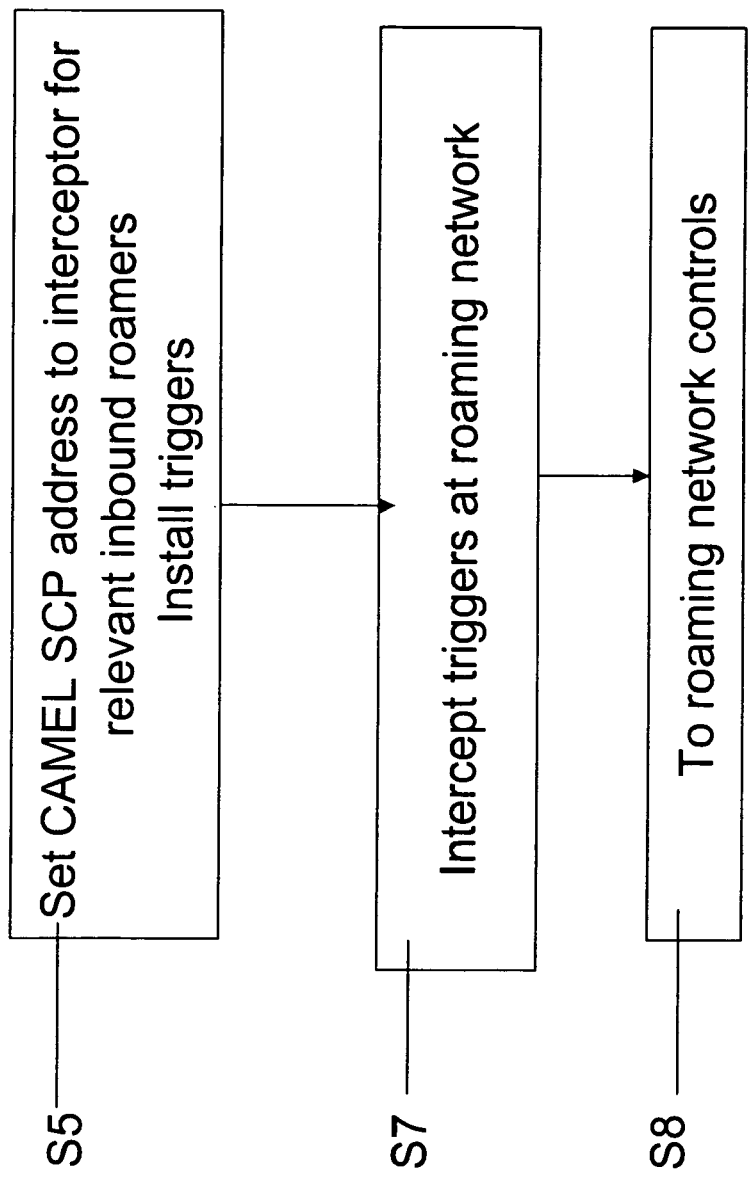
FIG. 5 is a variation of FIG. 4 for a roaming user who does not have CAMEL at his home network.

Referring now to FIG. 5, the same setting of the home address to the interceptor takes place, stage S5. Then, as will be explained below, CAMEL triggers are installed for the non-CAMEL user. The triggers are then intercepted as before in stage S7 and are sent to the roaming network control so that the roaming network can provide services.

The preferred embodiments in fact provide many CAMEL based roaming services to inbound roamers, irrespective of whether they are roamers with CAMEL availability, that is to say without the need of one by one agreements and integration with each roaming partner. The platform of the above-described embodiments is only required at or in association with the visited network.

In fact, for those roamers who are without CAMEL availability, the platform 14 can act as a virtual home network, and provide services for those roamers.

Platform 14 preferably monitors all international GSM MAP traffic, transmitted between the HPMIN and the VPMN. While a new roamer is being registered at the VPMN, the platform 14 detects the Update Location (UL) MAP transaction, which includes the UL message and the ISD reply from the HLR (Insert Subscriber Data), among other messages. The platform derives the roamer's telephone identification information, thus IMSI (international mobile subscriber identity), MSISDN (Mobile Subscriber ISDN) and current VLR address, from the registration transaction.

If the roamer does not have CAMEL availability, that is he belongs to group (b), the platform 14 preferably modifies the ISD reply and installs CAMEL triggers on behalf of that roamer, using trigger install unit 24. That is to say it actually produces the CAMEL triggers so that the group b) user looks like a group a) user.

In order to be able to modify MAP messages on the fly, the solution platform preferably contains a signaling relay module (SRM) 26. In addition to setting the triggers, the SRM sets the CAMEL SCP address to point to the platform, causing CAMEL triggers to reach the platform 14 instead of the home network.

This procedure is repeated for any given roamer after every VLR change occurs at the visited network, since that involves a new Update Location transaction with the HPMN.

Figure 6:
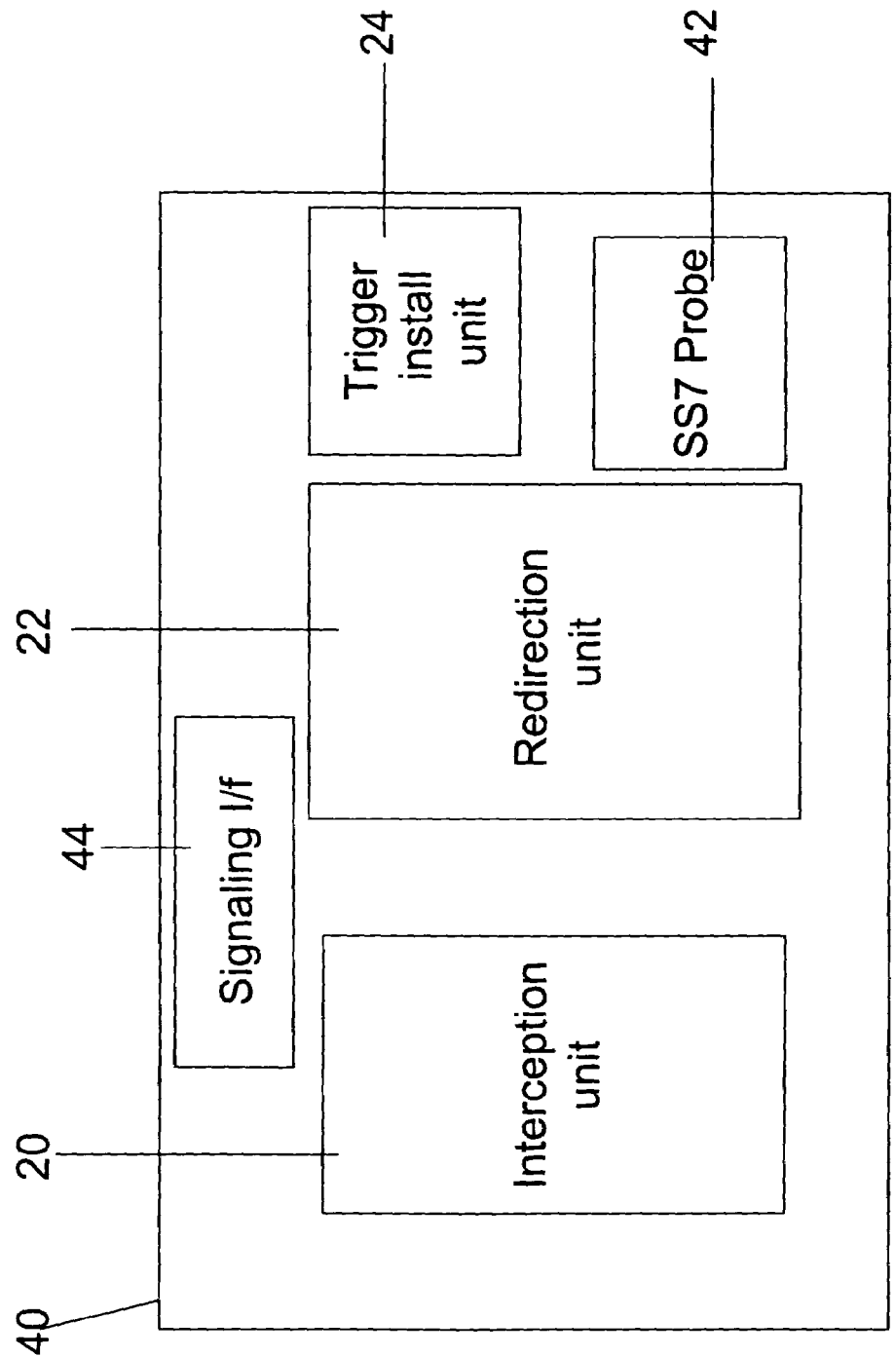
FIG. 6 illustrates a platform according to a second preferred embodiment of the present invention.

Reference is now made to FIG. 6 which is an alternative embodiment of the platform of the present invention. Parts that are the same as in previous figures are given the same reference numerals and are not discussed again except as needed for the present embodiment. Platform 40 differs from platform 14 in that it does not have signaling relay module 26 but instead has an SS7 probe 42 and a signaling interface 44. Platform 40 does not require modifying the original ISD reply coming from the HLR. Instead, the platform 40 sends to the local VLR an additional ISD message, following the original one. The additional message contains the CAMEL triggers and the modified SCP address, as explained hereinabove. The result is to override the original user attributes installed at the VLR by the original ISD message. This solution does not require signaling relay module 26 since there is no longer any need for on-the-fly modifications of MAP messages. Instead, Platform 14 includes SS7 signaling probe 42, that is a passive SS7 signaling monitor unit which can monitor Update Location and ISD messages, as well as other messages, without intervention.

In addition, signaling interface 44 enables platform 40 to actively initiate signaling messages, such as the additional MAP ISD message.

Now, for roamers having full CAMEL availability, the above-mentioned group (a), platform 14 cannot replace the actual home SCP for CAMEL roamers. However, it can override the home SCP registered at the VLR, receive the CAMEL triggers as described above and provide a service if available. Then, acting as an SSP, it communicates the CAMEL trigger to the real home SCP, for performing the original task the trigger was set for, if that is available at the home network. The redirection unit thus stores the real home SCP address for each subscriber, while replacing it with the platform 14 address.

Group (a) includes CAMEL-based prepaid users or CAMEL-based virtual private network (VPN) users as examples which signify the main business for CAMEL as of today.

The following paragraphs specify the roaming services that can be provided based on the above solution platform. More services can be developed, based on this concept.

The virtual home environment or VHE comprises a group of services for inbound roamers, including Home Short Code (HSC), Global Direct Access (GDA) and Intelligent Call Assistance (ICA) and others. The various services are described in greater detail in the following patent applications: EP 03101624.9, EP 00311576.3, U.S. Ser. No. 09/739,881. The current embodiments eliminate the need for ISUP (ISDN user part) or INAP (intelligent network application part) integration, which has been required so far, by making use of the already existing CAMEL infrastructure.

In the group (a) case, and in particular for prepaid users, where it is necessary to have contact with the home environment to know what funds are available, the solution platform can provide VHE services for prepaid users, by translating the HSC to a long number for example, and forwarding the long number as the dialed number to the home SCP, for call completion.

Figure 7:
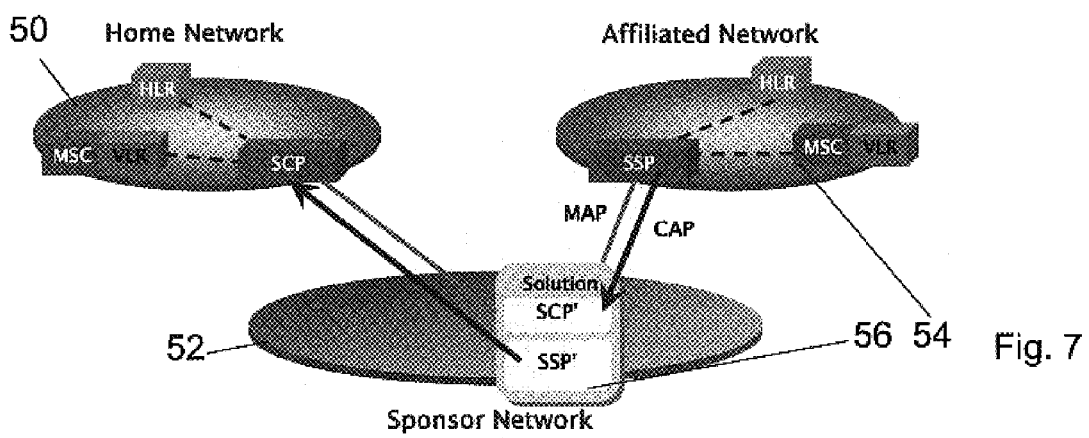
FIG. 7 illustrates a roaming broker service in which an intermediate network relays CAMEL triggers between two networks which both have CAMEL but do not have a CAMEL agreement between them.

Reference is now made to FIG. 7 which shows three mobile networks, a home network 50, a sponsor network 52 and an affiliated network 54. An intelligent roaming enabler, otherwise known in the field under the name "Roaming Broker" carries out brokering of roaming agreements. Using the broker, a network which has already established several roaming agreements (the sponsor network) offers small/new networks (affiliated networks) the chance to take advantage of its agreements, instead of signing their own new agreements. Currently known solution platforms are available for GSM roaming, covering voice and data (SMS and GPRS) services.

According to the present embodiments it is possible to supply a platform for CAMEL brokering for affiliated networks which have CAMEL support.

A platform 56 is located at the sponsor network 52, and acts as a home SCP for inbound roamers visiting at the affiliated network 54. That is to say the roamers at the affiliated network have their triggers redirected to the CAMEL SCP of the present embodiments at the sponsor network 52. The sponsor network 52 then passes on the trigger to the home network 50, which thinks it has come from the sponsor network 52, with which it has an agreement. In reality the trigger comes from the affiliated network 54, with which the home network does not have an agreement, and would not normally be acceptable.

The main difference therefore between the VHE and the IRE cases, in terms of network architecture, is the location of the platform 14.

Optimal Routing is a service that is already known for cellular operators, and is intended to establish a local call between two roamers roaming in the same visited network. Thus two roamers from the UK currently located in Germany can talk to each other directly over the German network without involving the UK network. Without this service, the call is forwarded first to the home network of the called party, and both roamers are charged for an international leg.

According to the preferred embodiments, the platform 14 receives triggers for all roaming mobile originated MO calls, using the existing CAMEL infrastructure, instead of expensive ISUP or IN (Intelligent Network) integration. Thus it knows that a roamer in its network is calling another roamer in its network and can connect them directly.

Another service that the platform 14 can provide is a local prepaid service. The VPMN can set up a local account and be informed whenever the roamer incurs charges. That is to say the VPMN can use the existing CAMEL infrastructure for receiving triggers for all MO roaming calls. The roamers simply purchase local prepaid cards, and the solution platform, located at the VPMN, manages a local temporary account for them, charging MO calls in local tariffs.

It is expected that during the life of this patent many relevant devices and systems will be developed and the scope of the terms herein, particularly of the terms "roaming", "mobile network", "CAMEL", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for routing at least one cellular trigger for a roaming cellular user having a home cellular network and a roaming cellular network, at least the roaming cellular network having an infrastructure that supports passing of call control functions from the roaming cellular network to a compatible home network, said roaming cellular network having a call control processing unit for carrying control functions for calls, the apparatus comprising:
   an interception unit associated with said roaming network for intercepting respective cellular triggers issued in association with said infrastructure and directed at a respective call control processing unit of said home network, and
   a redirector, associated with said interception unit for redirecting said respective cellular triggers to a respective call control unit of said roaming network, thereby to allow said roaming network call control unit to carry out at least one call control function, wherein said call control function is to provide to said user a service from a group consisting of home short code, global direct access, intelligent call assistance, optimal routing and local prepaid.

2. Apparatus according to claim 1, wherein said cellular trigger is a call trigger.

3. Apparatus according to claim 1, wherein said cellular trigger is at least one of the group consisting of an SMS trigger and a GPRS trigger.

4. Apparatus according to claim 1, wherein said redirector is further configured to pass said cellular triggers on to said home network after said roaming network call control unit has carried out said at least one call control function.

5. Apparatus according to claim 4, wherein said roaming network call control unit is configured to make available, to said roaming user, services that are provided to home users of said roaming network following said redirecting thereto of said cellular triggers, and wherein said redirector is configured to carry out said subsequent passing on to said home network when services of said home network are required.

6. Apparatus according to claim 1, wherein said roaming network call control unit is configured to make available, to said roaming user, services of said roaming network following said redirecting thereto of said cellular triggers.

7. Apparatus according to claim 1, configured as a platform external to said roaming network.

8. Apparatus according to claim 1, wherein said infrastructure is CAMEL.

9. Apparatus according to claim 8, wherein said interception unit is further configured to intercept triggers from an external roaming network and redirect said triggers to a home network indicated in association with said triggers, thereby to provide CAMEL interoperability between said indicated home network and said external network.

10. Apparatus according to claim 1, wherein said infrastructure is located both at said home network and said roaming network.

11. Method for obtaining at least one call control function for a roaming cellular user having a home cellular network and a roaming cellular network, at least the home cellular network having an infrastructure that supports passing of call triggers from the roaming cellular network to a compatible home network, each network having a call control processing unit for carrying out functions for calls, the method comprising:
   intercepting said call triggers issued in association with said infrastructure and directed at a respective call control processing unit of said home network,
   redirecting said call triggers to the respective call control unit of said roaming network, thereby to allow said roaming network call control unit to carry out at least one call control function, and
   passing said call triggers on to said home network after said roaming network call control unit has carried out said at least one call control function, wherein said call control function is to provide to said user a service from a group consisting of home short code, global direct access, intelligent call assistance, optimal routing and local prepaid.

12. The method of claim 11, comprising making available, to said roaming user, services that are provided to home users of said roaming network following said redirecting thereto of said call triggers, and further comprising carrying out said subsequent passing on to said home network when services of said home network are required.

13. The method of claim 11, wherein said intercepting comprises setting an interception address in place of a home network address over said roaming network.

14. The method of claim 11, wherein said infrastructure is CAMEL.

15. The method of claim 11, wherein said infrastructure is located both at said home network and said roaming network.

16. The method of claim 11, wherein said intercepting further comprises interception of events from an external roaming network and redirection of said events to a home network indicated in association with said triggers, thereby to provide CAMEL interoperability between said indicated home network and said external network.

17. The method of claim 11, further comprising making available, to said roaming user, services that are provided to home users of said roaming network following said redirecting thereto of said call triggers.

18. A cellular network able to support home users and roaming users and having a services infrastructure for providing support to outbound roamers, the network comprising:
   an interception unit for intercepting event signals from inbound roamers requesting support from respective home networks;
   a redirection unit for redirecting said event signals to provide support to said inbound roamers from said services infrastructure for providing support to outbound roamers, and
   a call control unit for carrying out at least one call control function, wherein said call control function is to provide to said user a service from a group consisting of home short code, global direct access, intelligent call assistance, optimal routing and local prepaid, the network being configured to pass said call triggers on to said home network after said call control unit has carried out said at least one call control function.

* * * * *